(12) United States Patent
Kudo et al.

(10) Patent No.: US 8,532,880 B2
(45) Date of Patent: Sep. 10, 2013

(54) STEERING ASSIST APPARATUS IN RESPONSE TO LANE DEPARTURE DIRECTION AND VEHICLE IN NEIGHBORING LANE

(75) Inventors: Shinya Kudo, Tokyo (JP); Hajime Oyama, Tokyo (JP); Takeshi Terazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 993 days.

(21) Appl. No.: 12/603,977

(22) Filed: Oct. 22, 2009

(65) Prior Publication Data

US 2010/0100284 A1    Apr. 22, 2010

(30) Foreign Application Priority Data

Oct. 22, 2008   (JP) ................................. 2008-271989

(51) Int. Cl.
*B62D 6/00* (2006.01)

(52) U.S. Cl.
USPC ........................................................... 701/42

(58) Field of Classification Search
USPC .................. 701/23, 41, 42, 96; 180/6.2, 401, 180/410
See application file for complete search history.

(56) References Cited

U.S. PATENT DOCUMENTS

| | | | | |
|---|---|---|---|---|
| 5,483,453 A * | 1/1996 | Uemura et al. | ................. | 701/23 |
| 6,092,619 A * | 7/2000 | Nishikawa et al. | ........... | 180/446 |
| 6,138,062 A * | 10/2000 | Usami | ............................. | 701/23 |
| 6,185,492 B1 * | 2/2001 | Kagawa et al. | ................. | 701/41 |
| 6,370,474 B1 * | 4/2002 | Hiwatashi et al. | ............ | 701/300 |
| 6,567,737 B2 * | 5/2003 | Nakamura et al. | ............... | 701/96 |
| 6,970,777 B2 * | 11/2005 | Tange et al. | ...................... | 701/41 |
| 6,970,787 B2 * | 11/2005 | Matsumoto et al. | .......... | 701/301 |
| 7,136,755 B2 * | 11/2006 | Yamamura | ..................... | 701/301 |
| 7,379,815 B2 * | 5/2008 | Kobayashi et al. | ........... | 701/300 |
| 7,509,211 B2 * | 3/2009 | Niwa et al. | ..................... | 701/417 |
| 7,510,038 B2 * | 3/2009 | Kaufmann et al. | ........... | 180/169 |
| 7,620,497 B2 * | 11/2009 | Maass | ............................ | 701/301 |
| 7,680,569 B2 * | 3/2010 | Matsumoto et al. | ............ | 701/28 |
| 7,688,186 B2 * | 3/2010 | Kataoka et al. | ............... | 340/435 |
| 7,765,066 B2 * | 7/2010 | Braeuchle et al. | ............ | 701/301 |
| 8,145,385 B2 * | 3/2012 | Hayakawa et al. | ............. | 701/42 |
| 8,346,436 B2 * | 1/2013 | Yokoyama et al. | ............. | 701/41 |
| 2006/0047390 A1* | 3/2006 | Scherl et al. | .................... | 701/41 |

FOREIGN PATENT DOCUMENTS

| | | |
|---|---|---|
| JP | 2000-025631 | 1/2000 |
| JP | 2001-048036 | 2/2001 |
| JP | 2006-069344 | 3/2006 |

* cited by examiner

*Primary Examiner* — Thomas Black
*Assistant Examiner* — Sze-Hon Kong
(74) *Attorney, Agent, or Firm* — Haynes and Boone, LLP

(57) ABSTRACT

A steering assist apparatus of a vehicle includes: a lane set unit to recognize an environment of ahead the vehicle; a deviation determination unit to determine whether the vehicle has a deviation tendency from a traveling lane; a steering control unit to apply steering force in a deviation avoiding direction to the steering mechanism when it is determined that the vehicle has a deviation tendency; a neighboring vehicle detection unit to detect a neighboring vehicle, which travels ahead of the vehicle in a lane next to the traveling lane of the vehicle; and an approach degree calculation unit to calculate an approach degree of the neighboring vehicle toward the vehicle. When the vehicle has a deviation tendency in a direction away from the traveling lane of the neighboring vehicle, the steering control unit reduces the steering force in the deviation avoiding direction according to an increase of the approach degree.

6 Claims, 9 Drawing Sheets

STEERING ASSIST APPARATUS IN RESPONSE TO LANE DEPARTURE DIRECTION AND VEHICLE IN NEIGHBORING LANE

CROSS-REFERENCE TO RELATED APPLICATIONS

The disclosure of Japanese Patent Application No. 2008-271989 filed on Oct. 22, 2008 including the specification, drawings and abstract is incorporated herein by reference in its entirety.

BACKGROUND OF THE INVENTION

1. Field of the Invention

The present invention relates to a steering assist apparatus provided to a vehicle such as a car and configured to recognize an environment ahead of the vehicle and apply steering force to a steering mechanism of the vehicle. More specifically, the present invention relates to a steering assist apparatus capable of reducing an interference with driver's steering operations when avoiding a neighboring vehicle.

2. Description of the Related Art

A steering assist apparatus is, for example, to recognize an environment ahead of a vehicle using a stereo camera and the like, and apply steering force to a steering mechanism of the vehicle to assist driver's driving operations.

When the vehicle has a deviation tendency from a traveling lane, for example, the steering assist apparatus executes a lane deviation prevent control for applying steering force in a deviation preventing direction, or a lane-keeping assist control for applying steering force so that the vehicle travels along a target traveling position set within the lane.

When there is an obstruction such as a preceding vehicle in a lane next to a lane where the vehicle is traveling and the vehicle passes to travel ahead of the obstruction, for example, a driver of the vehicle tend to avoid the obstruction by traveling a position deflected from the center of the lane or intentionally traveling out of the lane in order to keep a distance between the vehicle and the obstruction.

JP-A-2001-048036 discloses a traveling line follow-up apparatus of the vehicle, which dislocates a target traveling line away from an obstruction to avoid the obstruction in case where there is an obstruction in a traveling lane next to a traveling lane in which the vehicle is traveling.

Further, JP-A-2006-069344 discloses a technology in which, when there is a traffic jam in a neighboring lane, a traveling position of a vehicle is dislocated in a direction away from the neighboring lane to deal with a neighboring vehicle which may move into the lane of the vehicle from the neighboring lane.

Further, JP-A-2000-025631 discloses a technology in which, an approach degree with respect to a preceding vehicle is detected based on an inter-vehicle distance detected by an inter-vehicle distance sensor such as a radar and steering force is reduced corresponding to the detected approach degree.

In the technologies disclosed in JP-A-2001-048036 and JP-A-2006-069344, however, the target traveling line is dislocated regardless of the lateral position of the vehicle in the lane when there is an obstruction in the neighboring lane or there is a traffic jam in the neighboring lane. With such configurations, for example, the target traveling line is changed even when the neighboring vehicle in the neighboring lane travels sufficiently away from a traveling lane of the vehicle so that a driver of the vehicle does not feel a need to avoid the neighboring vehicle. In this case, when the driver determines that there is no need to avoid the neighboring vehicle so that the driver tries to travel along the lane, an interference with the driver's operations is generated and the driver may experience discomfort.

On the other hand, in the technology disclosed in JP-A-2000-025631, the steering force is reduced according to the approach degree with respect to the inter-vehicle distance regardless of the lateral position of the preceding vehicle and the like. With such a configuration, since the control is reduced even when there is a sufficient lateral distance from the preceding vehicle, the driver cannot obtain an expected level of assistance.

SUMMARY OF THE INVENTION

The present invention aims to provide a steering assist apparatus capable of reducing an interference with driver's steering operations when avoiding a neighboring vehicle.

According to a first embodiment of the invention for solving the problems described above, there is provided a steering assist apparatus of a vehicle, for applying steering force to a steering mechanism of the vehicle so that the vehicle travels on a target traveling position in a traveling lane; including: a lane set unit configured to recognize an environment ahead the vehicle and set the traveling lane; a deviation determination unit configured to determine whether the vehicle has a deviation tendency from the traveling lane; a steering control unit configured to apply steering force in a deviation avoiding direction to the steering mechanism when it is determined that the vehicle has a deviation tendency; a neighboring vehicle detection unit configured to detect a neighboring vehicle, which travels ahead of the vehicle and in a lane next to the traveling lane of the vehicle, based on the recognized environment; and an approach degree calculation unit configured to calculate an approach degree of the neighboring vehicle toward the vehicle based on the neighboring vehicle detection, and, when the deviation determination unit determines that the vehicle has a deviation tendency in a direction away from the traveling lane of the neighboring vehicle, the steering control unit performs a steering force reduction control for reducing the steering force in the deviation avoiding direction according to an increase of the approach degree.

According to a second embodiment of the invention, there is provided the steering assist apparatus according to the first embodiment, further including: a distance detection unit configured to detect a distance between the vehicle and the neighboring vehicle in a traffic direction of the vehicle; a relative velocity detection unit configured to detect a relative velocity of the neighboring vehicle with respect to the vehicle; and a end time estimation unit configured to estimate an end time of a parallel travel of the vehicle and the neighboring vehicle based on the distance and the relative velocity, and the steering control unit ends the steering force reduction control based on the parallel travel end time estimated by the parallel travel end time estimation unit.

According to a third embodiment of the invention, there is provided the steering assist apparatus according to the second embodiment, further including a side surface recognition unit configured to recognize a front end of a side surface in the neighboring vehicle based on a group of images of the neighboring vehicle captured by a plurality of imaging units, and the distance detection unit and the relative velocity detection unit detect the distance and the relative velocity respectively by referring to the recognized front end.

According to a fourth embodiment of the invention, there is provided the steering assist apparatus according to the first embodiment, further including a decelerating operation detection unit configured to detect a decelerating operation by a driver, and the steering control unit reduces the steering force at a greater degree when the decelerating operation is detected than the case where the decelerating operation is not detected.

According to a fifth embodiment of the invention, there is provided the steering assist apparatus according to the first embodiment, wherein the steering control unit performs a steering force increase control for increasing the steering force in the deviation avoiding direction according to an increase of the approach degree when the deviation determination unit determines that the vehicle has a deviation tendency toward the traveling lane of the neighboring vehicle.

According to a sixth embodiment of the invention, there is provided the steering assist apparatus according to the first embodiment, wherein the steering control unit applies steering force, in which a predetermined gain is multiplied to a lateral displacement of the vehicle from the traveling lane, to the steering mechanism, and switches the gain to a predetermined value smaller than the normal gain when the approach degree of the neighboring vehicle is kept greater than a predetermine threshold value for longer than a predetermined period of time.

According to an embodiment of the present invention, the following effects can be obtained. (1) When it is determined that the vehicle has a deviation tendency in a direction away from the traveling lane of the neighboring vehicle, the steering force in the deviation avoiding direction is reduced according to the increase of the approach degree of the neighboring vehicle. This reduces an interference with a driver's steering operation when the driver intentionally tries to deviate from the lane and accordingly prevents the driver from experiencing discomfort. Further, since the steering force is reduced according the approach degree, a lane deviation can be prevented by controlling the reduction of the steering force if the approach degree is low so that the driver is less likely to operate to avoid the neighboring vehicle. On the other hand, when the approach degree is high so that the driver is likely to operate to avoid the neighboring vehicle, the steering force is considerably reduced to improve the interference prevention effect. (2) Since a parallel traveling end time is estimated based on the distance and relative velocity related to the neighboring vehicle and a steering force reduction control is ended corresponding to the estimation, the steering assist control unit can return to a normal control to assist driver's driving operations after the condition of parallel traveling with the neighboring vehicle ends. (3) Since the distance and relative velocity related to the neighboring vehicle are detected by using, as the reference, the front end of the side surface on the neighboring vehicle recognized by the side surface recognition unit, the above described parallel traveling end time can be estimated properly. (4) The steering force is reduced at a greater degree when the decelerating operation is detected than the case where the decelerating operation is not detected. This can prevent an interference with an emergency avoiding operation by the driver. (5) When it is determined that the vehicle has a deviation tendency toward the traveling lane of the neighboring vehicle, the steering force in a deviation avoiding direction is increased according to the increase of the approach degree. This can prevent that the vehicle deviates from the traveling lane toward the neighboring vehicle and contacts with the neighboring vehicle. (6) When the approach degree is kept equal to or greater than a predetermined threshold value for longer than a predetermined period of time, the gains used in a steering force calculation are switched to constant values which are smaller than the normal gains. This allows reduced variation of the control outputs.

DETAILED DESCRIPTION OF THE PREFERRED EMBODIMENTS

An embodiment of a steering assist apparatus to which the present invention is applied will be described. The steering assist apparatus of this embodiment is, for example, provided to a four-wheeled vehicle such as a passenger car in which two front wheels are steered.

Figure 1:
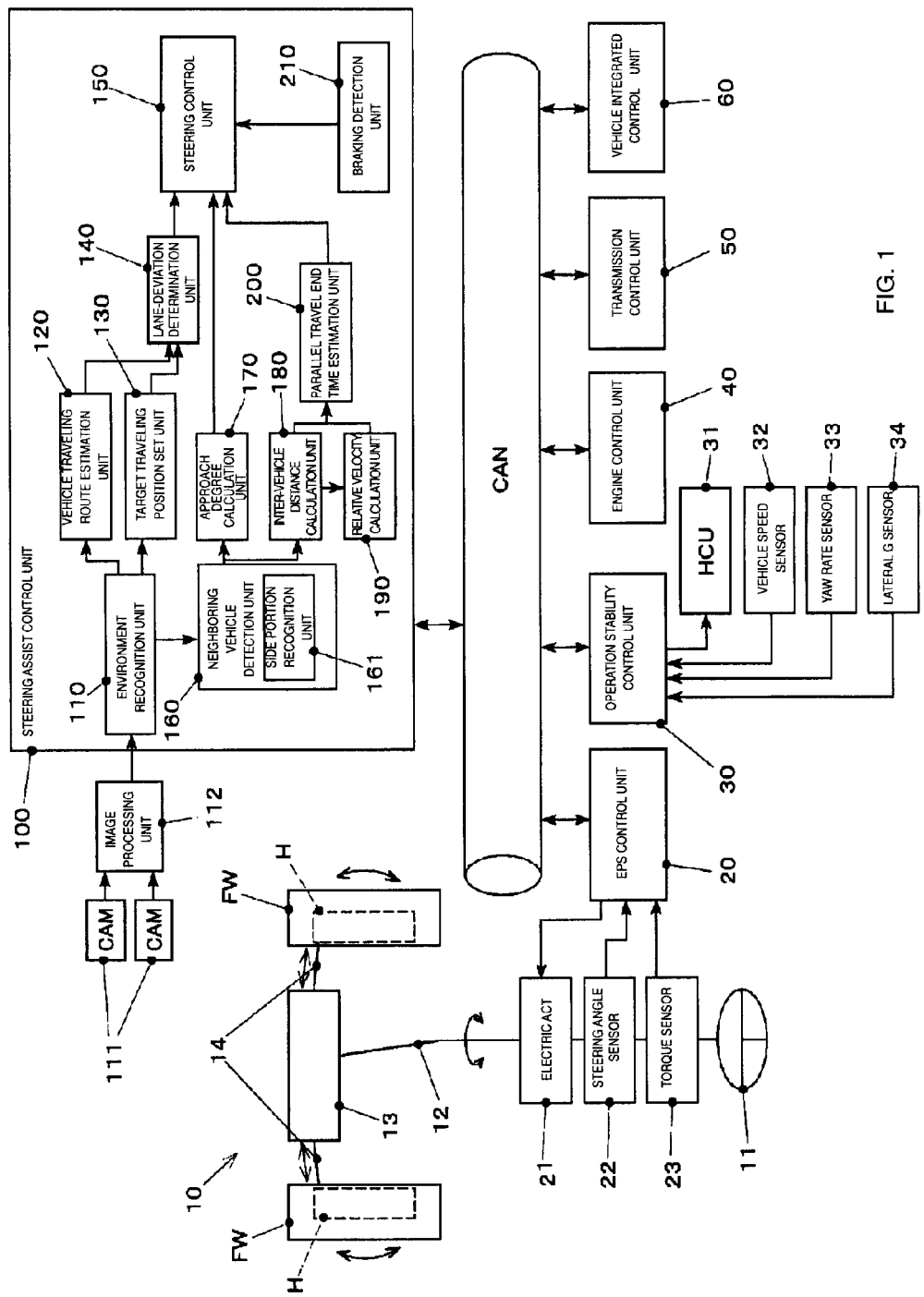
FIG. 1 is a diagram showing a system configuration of a vehicle including an embodiment of a steering assist apparatus to which the present invention is applied.

FIG. 1 is a diagram showing a system configuration of a vehicle including the steering assist apparatus of the embodiment.

The steering assist apparatus is configured to apply steering torque (steering force) to a steering mechanism 10.

The steering mechanism 10 is configured to steer by rotating housings H for supporting front wheels FW about a predetermined steering axis (kingpin).

The steering mechanism 10 includes a steering wheel 11, a steering shaft 12, a steering gearbox 13, tie rods 14 and the like.

The steering wheel 11 is an annular-shaped operation member to which a driver inputs steering operations.

The steering shaft 12 is a rotary shaft, which transmits a turn of the steering wheel 11 to the steering gearbox 13.

The steering gearbox 13 has a rack and pinion mechanism, which converts the rotational motion of the steering shaft 12 to a linear motion in a vehicle width direction.

The tie rods 14 are axial members and each of the tie rods 14 has one end coupled to a rack of the steering gearbox 13 and the other end coupled to a knuckle arm of the housing H. The tie rods 14 rotate the housings H by pushing and pulling the knuckle arms of the housings H to steer.

The vehicle includes an electric power steering device (EPS) control unit 20, an operation stability control unit 30, an engine control unit 40, a transmission (TM) control unit 50, a vehicle integrated control unit 60 and the like.

The EPS control unit 20 is configured to integrally control an electric power steering device that generates a steering assist force according to driver's steering operations. To the EPS control unit 20, an electric actuator 21, a steering angle sensor 22, a torque sensor 23 and the like are connected.

The electric actuator 21 is, for example, an electric motor which is provided to a mid-point of the steering shaft 12 and applies steering torque (steering force) to the steering mechanism 10 via a speed reducer.

The steering angle sensor 22 has an encoder, which detects an angular position of the steering shaft 12 (which is substantially the same as the angular position of the steering wheel 11).

The torque sensor 23 is interposed between the electric actuator 21 and the steering wheel 11 on the steering shaft 12 and configured to detect torque applied to the steering shaft 12. In general, the torque detected by the torque sensor 23 is substantially equal to the steering torque which is input to the steering wheel 11 by the driver. The operation stability control unit 30 is configured to perform a vehicle operation stability control and an ABS control to control braking force of the respective wheels. The vehicle operation stability control is to generate a yaw moment in a stabilizing direction by applying different braking forces to the inner wheels and outer wheels during a turn, when understeer or oversteer occurs. The ABS control (anti-lock brake system control) is to stabilize by reducing braking forces applied to the wheels when a tendency of locked wheels is detected.

To the operation stability control unit 30, a hydraulic control unit (HCU) 31, vehicle speed sensors 32, a yaw rate sensor 33, a lateral acceleration (lateral G) sensor 34 and the like are connected.

The HCU 31 is a unit for individually controlling brake fluid hydraulic pressures applied to hydraulic service brakes of the respective wheels. The HCU 31 includes a motor pump for applying pressure to the break fields, a solenoid valve for adjusting the pressure applied to caliper cylinders of the respective wheels, and the like.

The vehicle speed sensors 32 are provided to the housings supporting a hub bearing housing of the respective wheels and outputs vehicle speed pulse signals corresponding to the vehicle speed. When a predetermined process is performed on the vehicle speed pulse signals, a vehicle traveling speed can be obtained.

The yaw rate sensor 33 and lateral G sensor 34 include MEMS sensors for detecting a rotation speed of a vertical axis of the vehicle body and a lateral acceleration, respectively.

The engine control unit 40 is configured to integrally control an engine serving as a vehicle traveling power source and supplementary devices of the engine.

The transmission control unit 50 is configured to integrally control an automatic transmission for shifting and transmitting engine output to a differential gear of a drive shaft.

The vehicle integrated control unit 60 is configured to integrally control electrical components of the vehicle, which are not related to the above units.

The steering assist apparatus of the embodiment also includes a steering assist control unit 100, which will be described below.

The steering assist control unit 100 is connected to the EPS control unit 20, operation stability control unit 30, engine control unit 40, transmission control unit 50 and vehicle integrated control unit 60 via an on-vehicle LAN such as a CAN communication system and the like and is capable of obtaining various information and signals.

The steering assist control unit 100 further includes an environment recognition unit 110, a vehicle traveling route estimation unit 120, a target traveling position set unit 130, a lane-deviation determination unit 140, a steering control unit 150, a neighboring vehicle detection unit 160, an approach degree calculation unit 170, an inter-vehicle distance calculation unit 180, a relative velocity calculation unit 190, a parallel travel end time estimation unit 200, a braking detection unit 210 and the like. Here, these units may be composed of independent hardware or some or all of the units may be composed of common hardware.

The environment recognition unit 110 recognizes alignment of a lane in which the vehicle is traveling, preceding vehicles, a shape, size or position of an obstruction and the like, based on image information capturing ahead view of the vehicle. The environment recognition unit 110 functions as a lane set unit according to an embodiment of the present invention.

To the environment recognition unit 110, a stereo camera 111, an image processing unit 112 and the like are connected.

The stereo camera 111 includes, for example, a set of a main camera and a sub-camera disposed in the vicinity of a mounting base of a rearview minor on the upper end of a front window of the vehicle. The main camera and sub-camera respectively have a CCD camera respectively. The main camera and sub-camera are disposed separately from each other in the vehicle width direction. The main camera and sub-camera capture a reference image and a comparative image respectively and output image data of the captured images to the image processing unit 112.

The image processing unit 112 performs a predetermined image process on the converted data to output the processed data to the environment recognition unit 110 after executing an A/D conversion on the image data of the reference image and comparative image output from the stereo camera 111. The image process includes, for example, a correction of errors caused by the difference of the mounted positions of those cameras, a noise removal, a tone correction, and the like. The digitalized images have, for example, plural pixels which are vertically and horizontally arranged in a matrix state. The respective pixels have a brightness value according to the brightness of the captured subject.

The environment recognition unit 110 detects a parallax of an optional pixel or a group of pixels, which is a block composed of plural pixels, in the reference image based on the data of the reference image and comparative image. The parallax is a displacement amount between the positions of the pixel or the group of pixels in the reference image and the comparative image. When this parallax is used, a distance from the vehicle to the captured subject corresponding to the pixel can be calculated based on the principle of triangulation.

Figure 2:
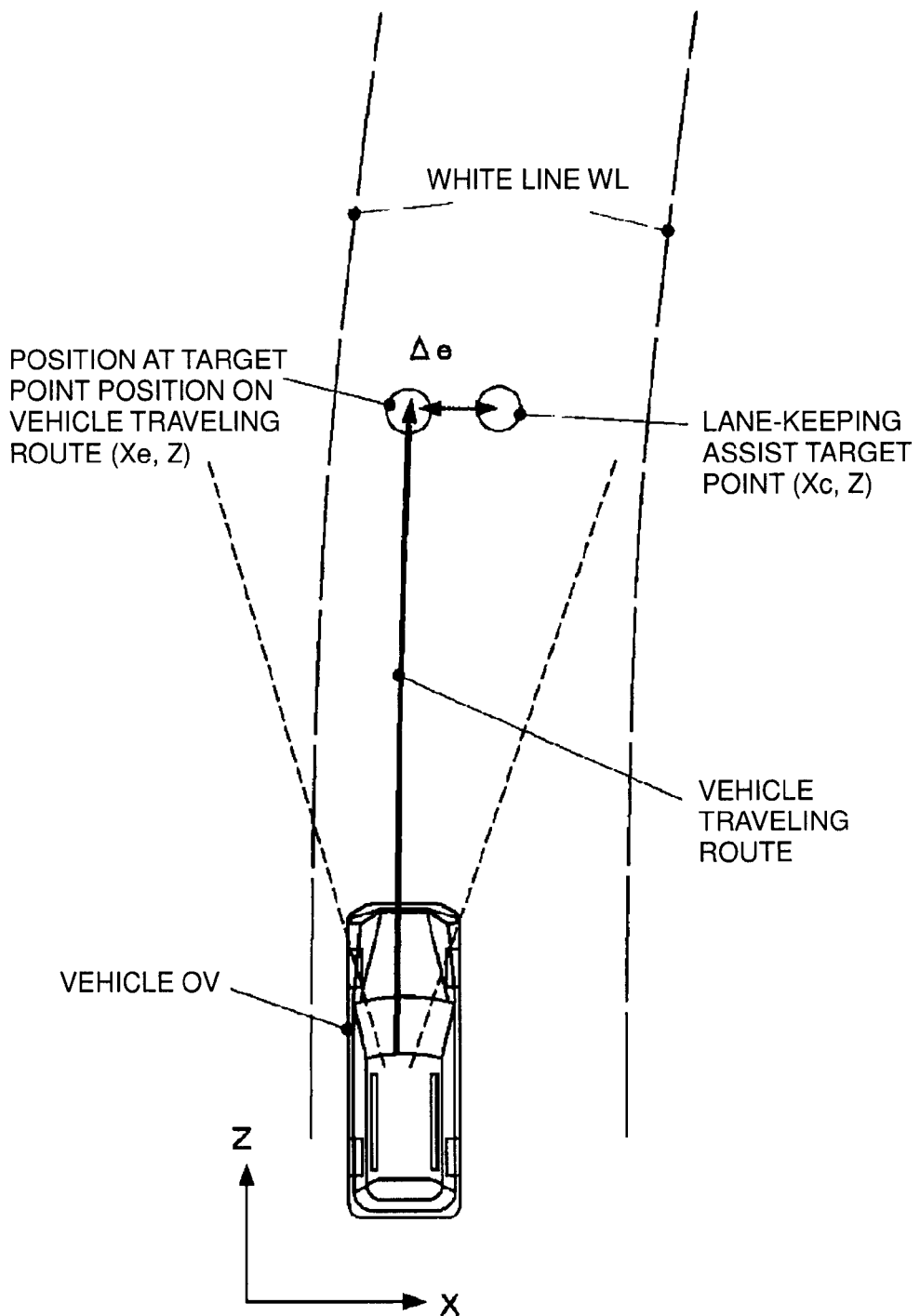
FIG. 2 is a diagram showing an example of a planner arrangement of the vehicle, a lane, a target traveling position and a vehicle traveling route.

FIG. 2 is a diagram showing an example of a planar arrangement of positions of the vehicle OV, the lane (white lines WL), a target traveling position Xc and a vehicle traveling route Xe.

The environment recognition unit 110 recognizes alignment of the white lines WL marked on both sides of the lane ahead of the vehicle OV, the position, shape and size of the preceding vehicle, and the like. The white line represents a continuous line or a dotted line marked on the width sides of the lane and includes lines of other colors (for example, orange lines).

The environment recognition unit 110 detects a group of pixels of the white lines WL in the data of the reference image based on the brightness data of these pixels. The orientation of the group of pixels of the white lines WL with respect to the vehicle OV is detected based on the positions of the pixels in the image data. Concretely, the environment recognition unit 110 horizontally scans the area of the positions of the pixels which vertically correspond to the surface of the road and recognizes the areas in which the brightness values suddenly change as the edges of the white lines WL. The environment recognition unit 110 calculates the distance of the group of pixels of the white line WL area to detect the position of the white lines WL.

Then, the environment recognition unit 110 recognizes the alignment of the lane ahead of the vehicle OV by continuously detecting the positions of the white lines WL and setting a plurality of assumed lane positions in the vehicle traveling direction, as ignoring assumed lane positions which do not match the continuity and performing a predetermined complement process on the area where the assumed lane positions cannot be set.

Further, the environment recognition unit 110 provides image data or information of the image data, which is related to a vehicle traveling a neighboring lane (neighboring vehicle NV (see FIG. 3)) to the neighboring vehicle detection unit 160.

The vehicle traveling route estimation unit 120 estimates a traveling route of the vehicle OV based on the information from the environment recognition unit 110, vehicle traveling conditions detected by the steering angle sensor 21, vehicle speed sensor 32, yaw rate sensor 33 and the like, and various known factors of the vehicle.

The vehicle traveling route estimation unit 120 estimates the vehicle traveling route by, for example, calculating a lateral position Xe of the vehicle OV ahead by the convergence distance Z which is a predetermined distance ahead of the vehicle. The convergence distance Z is a predetermined distance ahead of the vehicle OV and set to, for example, a position to which the vehicle OV reaches within a few seconds (about two seconds, for example).

There will be described a coordinate system having the center of gravity of the vehicle OV as an origin, the axis X extending in the vehicle width direction, and the axis Z extending forward of the vehicle.

The lateral position Xe of the vehicle traveling route in the convergence distance Z is obtained based on following Equation 1.

[Formula 1]

$$x_e = \frac{\alpha z^2}{2(1+AV^2) \cdot l_w \cdot n_{sgr}}$$ (Formula 1)

Xe[m]: estimated lateral position of the center of gravity of the vehicle in convergence distance
α[rad]: angle of steering wheel
A: stability factor
V[m/s]: vehicle speed
$l_w$[m]: wheel base
$n_{sgr}$: steering gear ratio
$n_{sgr}$: steering gear ratio The target traveling position set unit 130 is configured to set a target traveling position (assist control target point) (Xc, Z) of the vehicle OV. The target traveling position is set to a position which is the lane width center area (a position where the distances to the right and left white lines become equal) in the convergence distance Z, for example. Note that the setting position of the target traveling position is not limited the center area of the lane and can be changed according to need.

The deviation determination unit 140 compares the estimated lateral position Xe of the vehicle OV estimated by the vehicle traveling route estimation unit 120 and the lateral position Xc of the target traveling position set by the target traveling position set unit 130 and determines whether the vehicle OV has a deviation tendency with respect to the traveling lane of the vehicle OV. For example, the deviation determination unit 140 determines that the vehicle has a deviation tendency when the difference between the vehicle lateral position Xe and the target traveling position Xc is equal to or greater than a predetermine threshold value, for example.

The steering control unit 150 controls the electric actuator 21 via the EPS control unit 20 to apply steering torque to the steering mechanism 10, based on a difference between the estimated lateral position Xe of the vehicle OV estimated by the vehicle traveling route estimation unit 120 and the lateral position Xc of the target traveling position set by the target traveling position set unit 130.

When steering torque is applied, a target steering torque is set in a first order control and a third order control, which are later described, for example.

An expression for calculating a target steering torque it in the first order control is shown as Equation 2.

[Formula 2]

$$\tau 1 = G \times 1 \cdot \Delta e = G \times 1 \cdot (Xc - Xe)$$ (Formula 2)

τ1: first order control target steering torque
Δe: target difference [m]
Xe: estimated vehicle lateral position in convergence distance [m]
Xc: target traveling position [m]
Gx1: first order control steering torque computation gain An expression for calculating a target steering torque τ3 in the third order control is shown as Equation 3.

[Formula 3]

$$\tau 3 = G \times 3 \cdot \Delta e 3 = G \times 3 \cdot (Xc - Xe)3$$ (Formula 3)

τ3: third order control target steering torque
Δe: target difference [m]
Xe: estimated vehicle lateral position in convergence distance [m]
Xc: target traveling position [m]
Gx3: third order control steering torque computation gain The steering control unit 150 combines the first order control target steering torque τ1 and the third order control target steering torque τ3 in a predetermined ratio of shared controlling, further combines the target steering torque based on another control according to need, and sets a target steering torque τ for the entire steering assist apparatus.

The steering control unit 150 drives the electric actuator 21 via the EPS control unit 20 based on the set target steering torque τ and controls the steering mechanism 10 to apply the steering torque.

Here, the steering control unit 150 has a function for reducing the steering torque τ applied to the steering mechanism 10 when the approach degree of the neighboring vehicle NV, which is a preceding vehicle traveling a neighboring lane, with respect to the lane in which the vehicle OV is traveling is greater than a predetermined value and, at the same time, it is determined that the vehicle has a deviation tendency toward the lane away from the neighboring vehicle NV. This function will be described later in detail.

The neighboring vehicle detection unit 160 detects, with the environment recognition unit 110, a preceding vehicle (neighboring vehicle NV) traveling in a lane (neighboring lane) next to the lane in which the vehicle OV is traveling. Concretely, when there is an image having a predetermined characteristic on the neighboring lane in the image data, the neighboring vehicle detection unit 160 recognizes the image as an image of a neighboring vehicle NV.

Figure 3:
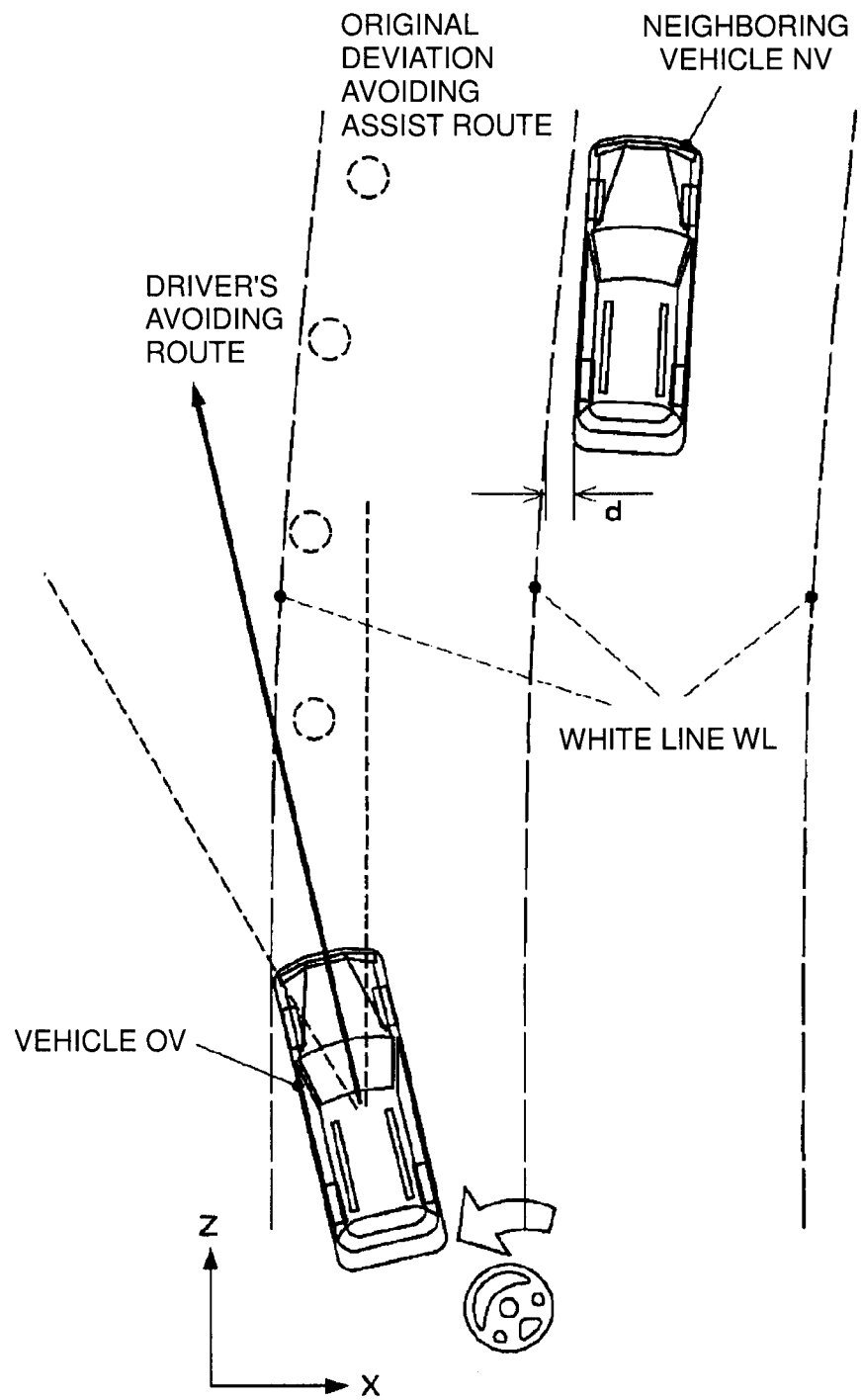
FIG. 3 is a diagram showing an example of a planner arrangement of the vehicle, lanes, and a neighboring vehicle.

FIG. 3 is a diagram showing an example of a planner arrangement of the vehicle OV, lanes, and neighboring vehicle NV. In the condition shown in FIG. 3, the neighboring vehicle NV is traveling on the right lane of the lane in which the vehicle OV is traveling. Thus, the driver inputs a leftward steering in order to intentionally deviate the vehicle OV to the left side of the traveling lane (the opposite side of the neighboring vehicle NV).

The neighboring vehicle detection unit 160 includes a side surface recognition unit 161. The side surface recognition unit 161 recognizes a side surface of the neighboring vehicle NV in the image data of the neighboring vehicle NV.

Figure 4:
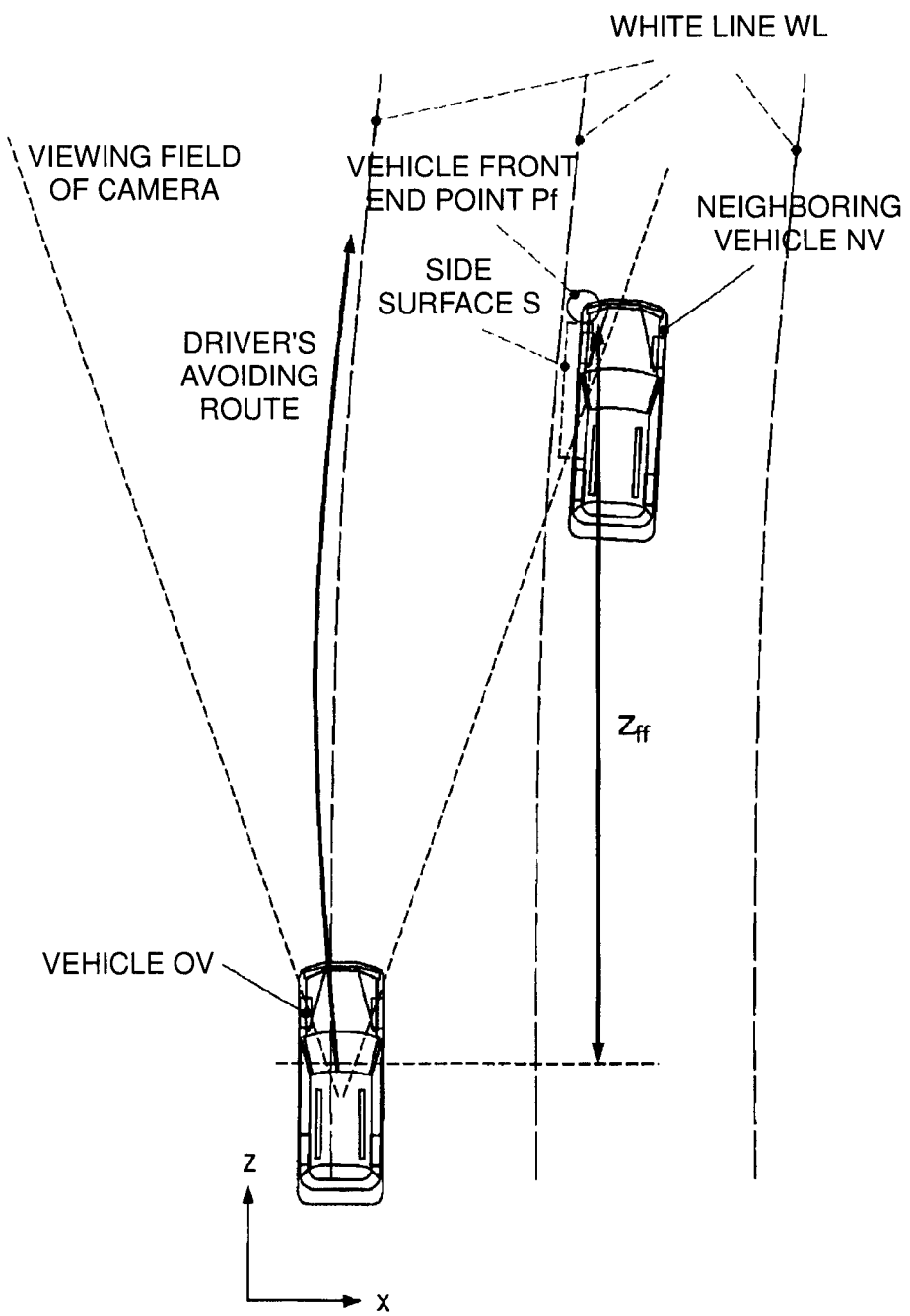
FIG. 4 is a diagram showing an example of a planner arrangement of the vehicle and the neighboring vehicle when a side surface recognition is executed.

FIG. 4 is a diagram showing an example of a planner arrangement of the vehicle OV and the neighboring vehicle NV when a side surface recognition is performed.

The side surface recognition unit 161 extracts a series of pixel groups aligned in a horizontal direction from the image of the neighboring vehicle NV and sequentially detects the positions of extracted pixel groups. Then, in the image data of the neighboring vehicle NV, the side surface recognition unit 161 recognizes an area of pixel groups aligned substantially along the Z axis direction as the side surface S.

Using the image data of the neighboring vehicle NV detected by the neighboring vehicle detection unit 160, the approach degree calculation unit 170 calculates a lateral distance d between an end point of the neighboring vehicle NV, which is in the side closer to the vehicle OV, and the white line WL which is located between the vehicle OV and the neighboring vehicle NV (see FIG. 3). The lateral distance d is a degree (approach degree) showing how close the neighboring vehicle NV is approaching to the traveling lane of the vehicle OV. Here, among the pixels composing the image of the neighboring vehicle NV, the pixels which horizontal positions are closest to the traveling lane of the vehicle OV can be used for the end point of the neighboring vehicle NV, which is in the side closer to the vehicle OV. The neighboring vehicle detection unit 160 and the approach degree calculation unit 170 may recognize a pattern of the image of the neighboring vehicle NV and extract a blinker (turn signal lamp), a brake lamp, a rear combination lamp, which is an assembly including those lamps, and the like based on the position and colors in the image of the neighboring vehicle NV to use one of those extraction as the end point of the neighboring vehicle NV.

The inter-vehicle distance calculation unit 180 calculates an inter-vehicle distance Zff to a vehicle front end point Pf of the side surface S in the neighboring vehicle NV recognized by the side surface recognition unit 161 of the neighboring vehicle detection unit 160, based on the parallax of the stereo camera 111 (see FIG. 4).

The relative velocity calculation unit 190 stores the inter-vehicle distances Zff, which are sequentially calculated by the inter-vehicle distance calculation unit 180, and calculates a relative velocity Vzf between the vehicle OV and the neighboring vehicle NV based on variation in the stored inter-vehicle distances Zff per unit time.

The parallel travel end time estimation unit 200 estimates a parallel travel end time, that is, when the vehicle OV completely passes and travels ahead of the neighboring vehicle NV so that the parallel traveling of the vehicle OV and the neighboring vehicle NV ends.

Figure 5:
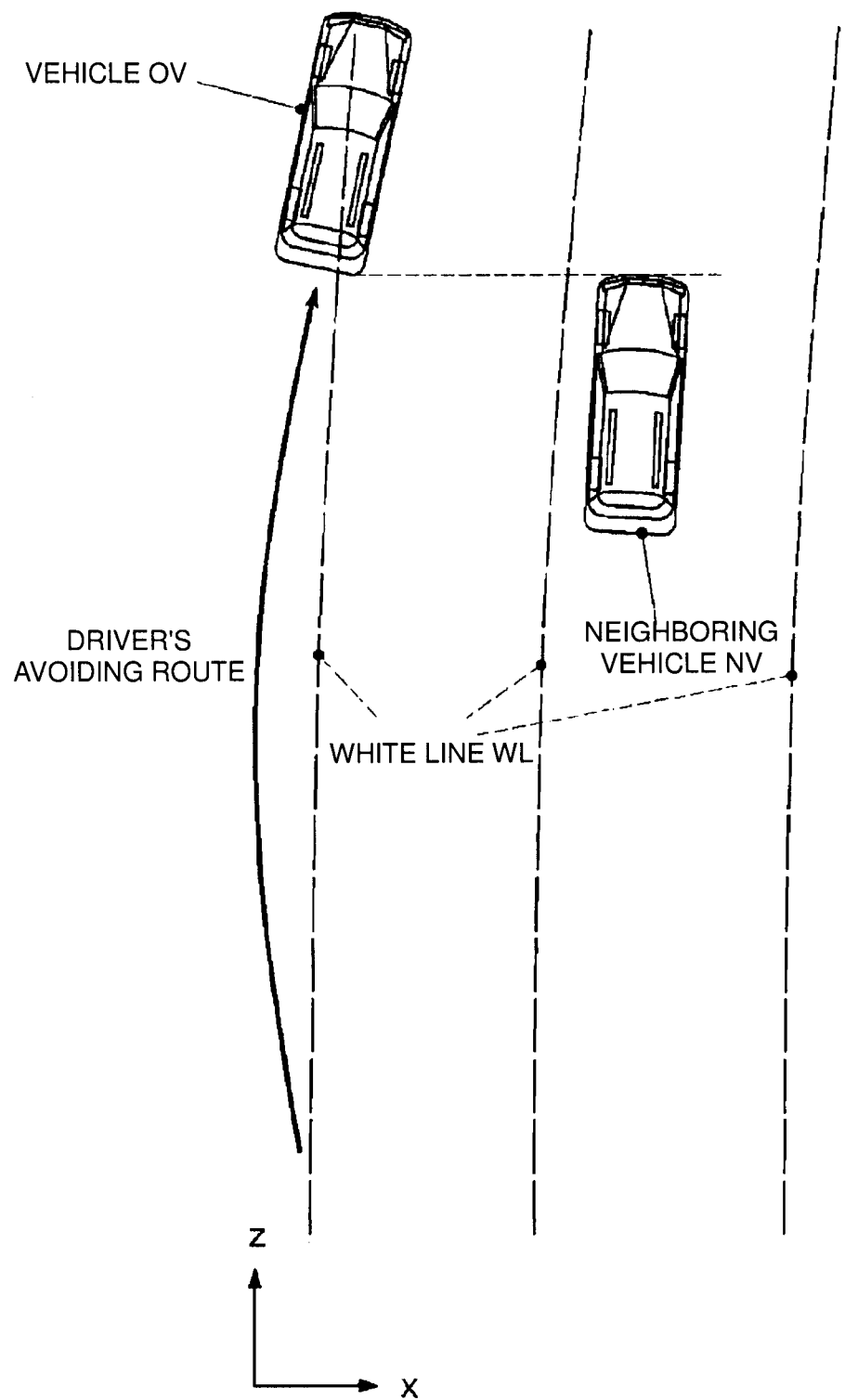
FIG. 5 is a diagram showing an example of a planner arrangement of the vehicle and the neighboring vehicle at a parallel travel end time.

FIG. 5 is a diagram showing an example of a planner arrangement of the vehicle OV and the neighboring vehicle NV during a parallel travel end time. The parallel travel end time estimation unit 200 estimates the time when the rear end of the vehicle OV travels ahead of the front end of the neighboring vehicle NV (in the Z axis direction) as the parallel travel end time.

An expression for determining the end of a parallel traveling (passing completion determination expression) used in the parallel travel end time estimation unit 200 is shown as Equation 4.

[Formula 4]

$$\int (\Delta V(t) + v_{zf}) dt > Z_{ff} \qquad \text{(Formula 4)}$$

V(t): vehicle speed [m/sec]
$V_{zf}$: final z-direction relative velocity at front end of neighboring vehicle
$Z_{ff}$: final z-direction relative position at front end of neighboring vehicle Here, the final z-direction relative velocity and the final z-direction relative position indicate the latest recognized relative velocity and relative position, when the vehicle OV approaches to the neighboring vehicle NV and accordingly the neighboring vehicle NV is out of the visual field of the stereo camera 111.

The braking detection unit 210 detects a braking operation (decelerating operation) by the driver by detecting a brake fluid pressure which the HCU31 applies to brake wheel cylinders of the respective wheels, for example.

An operation of a steering assist control in the steering assist apparatus according to the embodiment will be described.

Figure 6:
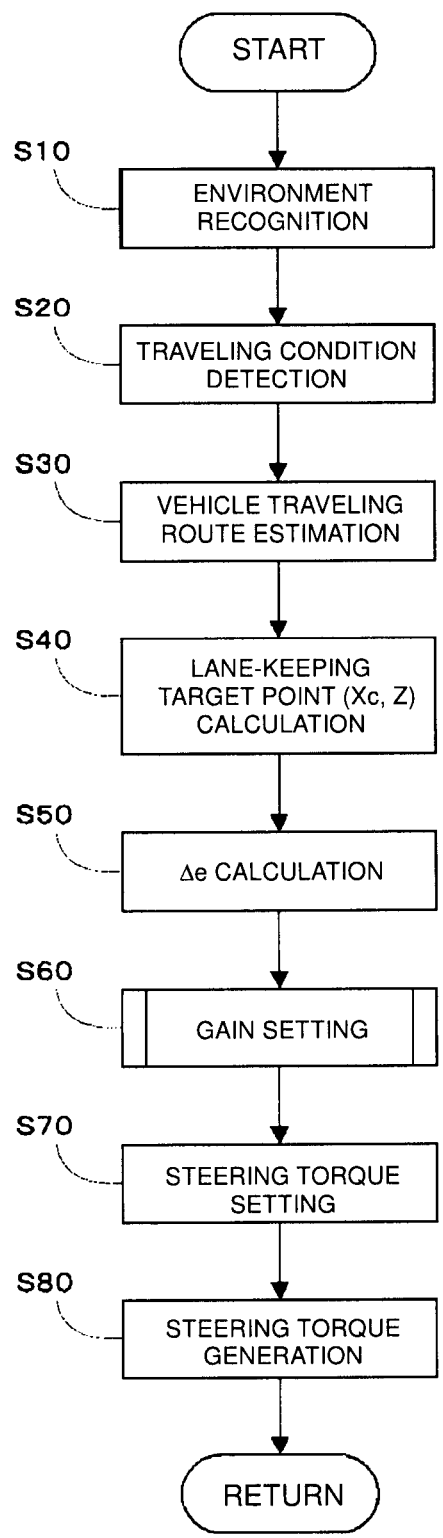
FIG. 6 is a flowchart showing an operation of a steering assist control in the steering assist apparatus of the embodiment.

FIG. 6 is a flowchart showing an operation of a steering assist control.

Figure 7:
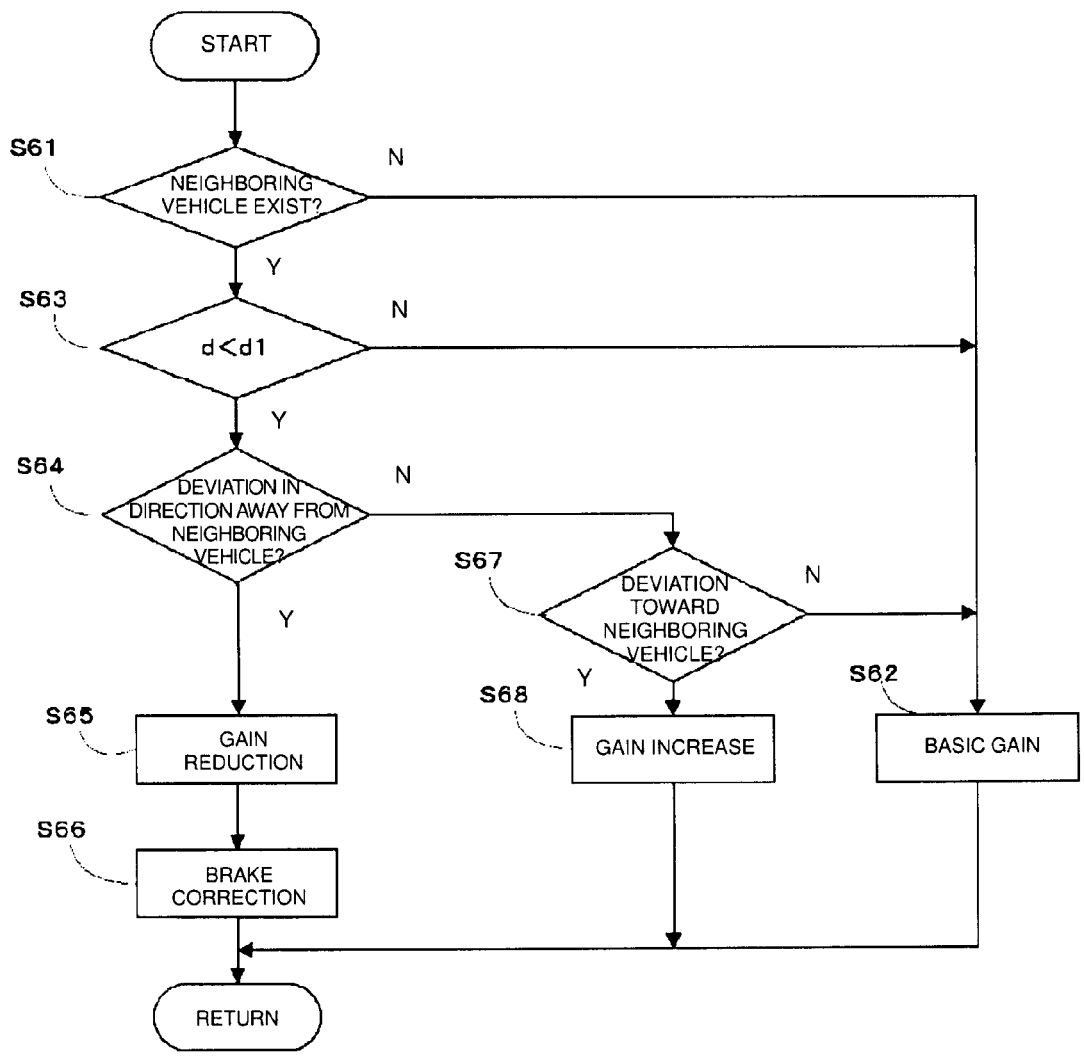
FIG. 7 is a flowchart showing a sub-routine of gain setting in FIG. 6.

FIG. 7 is a flowchart showing a subroutine of a gain setting in FIG. 6.

Firstly, steps in FIG. 6 will be described in order. <Step S10: environment recognition>

The environment recognition unit 110 recognizes alignment of the traveling lane of the vehicle OV using the stereo camera 111. After that, the process proceeds to step S20.

<Step S20: Traveling Condition Detection>

The vehicle traveling route estimation unit 120 obtains information such as a steering angle and a vehicle speed related to the traveling condition of the vehicle OV, which is required to estimate the traveling route of the vehicle OV. After that, the process proceeds to step S30.

<Step S30: Vehicle Traveling Route Estimation>

The vehicle traveling route estimation unit 120 estimates the traveling route of the vehicle OV based on Equation 1 and using the information obtained in step S20. After that, the process proceeds to step S40.

<Step S40: Lane Maintaining Target Point Calculation>

The target traveling position set unit 130 calculates a lane-keeping target point (Xc, Z). The lane-keeping target point is set to a position which is ahead of the vehicle OV by a predetermined convergence distance and in the middle of the lane width. After that, the process proceeds to step S50.

<Step S50: Calculation of Difference Δe Between Vehicle Traveling Route and Lane Maintaining Target Point>

The steering control unit 150 calculates a difference between the vehicle traveling route and the lane maintaining target point (Δe=Xc−Xe).

After that, the process proceeds to step S60.

<Step S60: Gain Setting>

The steering control unit 150 sets the above described first order control target steering torque τ1 and third order control target steering torque τ3.

The gain setting will be described with reference to the steps of FIG. 7 in order.

<Step S61: Neighboring Vehicle Presence/Absence Determination>

The steering control unit 150 detects the presence or absence of a neighboring vehicle NV, which is approaching to the vehicle OV, by using the neighboring vehicle detection unit 160, inter-vehicle distance calculation unit 180, relative velocity calculation unit 190 and the like. The determination of whether or not a neighboring vehicle NV is approaching to the vehicle OV is made by monitoring the time history of the inter-vehicle distance Zff from the vehicle OV to a neighboring vehicle NV and calculating the relative velocity Vr between the two vehicles, for example. When there is a neighboring vehicle NV approaching to the vehicle OV, the process proceeds to step S63 and, when there is not any neighboring vehicle NV approaching to the vehicle OV, the process proceeds to step S62.

<Step S62: Basic Gain Setting>

The steering control unit 150 sets a predetermined basic gain as the first order control target steering torque τ1 and the third order control target steering torque τ3. After that, the process returns to the main routine shown in FIG. 6 and proceeds to step S70.

<Step S63: Neighboring Vehicle Approach Degree Determination>

The steering control unit 150 compares the lateral distance d between the end point of the neighboring vehicle NV, which is in the side closer to the lane of the vehicle OV, and the white line WL calculated by the approach degree calculation unit 170 with a predetermined threshold value d1 (about 0.3 m, for example). When the distance d is smaller than the threshold value d1, it is determined that the approach degree is high and the process proceeds to step S64. In other cases, the process proceeds to step S62.

<Step S64: Determination of Deviation Tendency from Lane in Direction Away from Neighboring Vehicle>

The deviation determination unit 140 determines whether the vehicle OV has a lane deviation tendency in a direction away from the lane in which the neighboring vehicle NV is traveling. When it is determined that the vehicle OV has a deviation tendency, the process proceeds to step S65. In other cases, the process proceeds to step S67.

<Step S65: Gain Reduction>

The steering control unit 150 executes a steering force reduction control for reducing the first order control steering torque computation gain GX1 and the third order control steering torque computation gain GX3 according to the increase of the approach degree (that is, the reduction of distance d).

Figure 8:
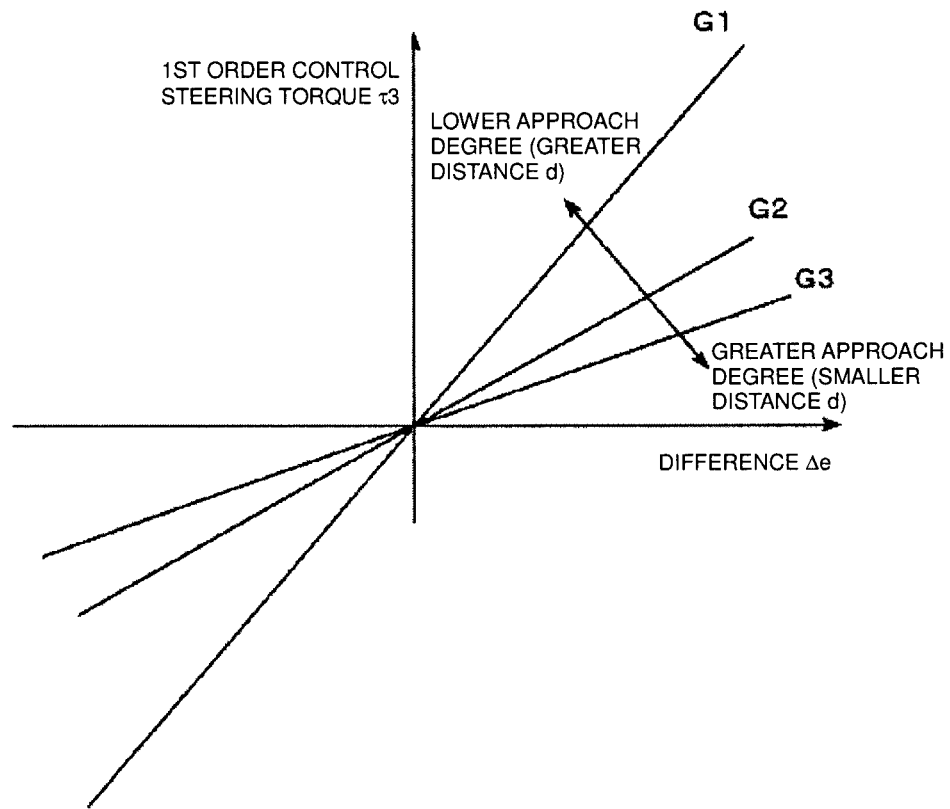
FIG. 8 is a graph showing a correlation between a deviation and a first order control target steering torque when a first order control steering torque computation gain is changed according to an approach degree in the steering assist apparatus of the embodiment.

FIG. 8 is a graph showing a correlation between the difference Δe and the first order control target steering torque τ1 when the first order control steering torque computation gain GX1 is changed according to the approach degree.

Figure 9:
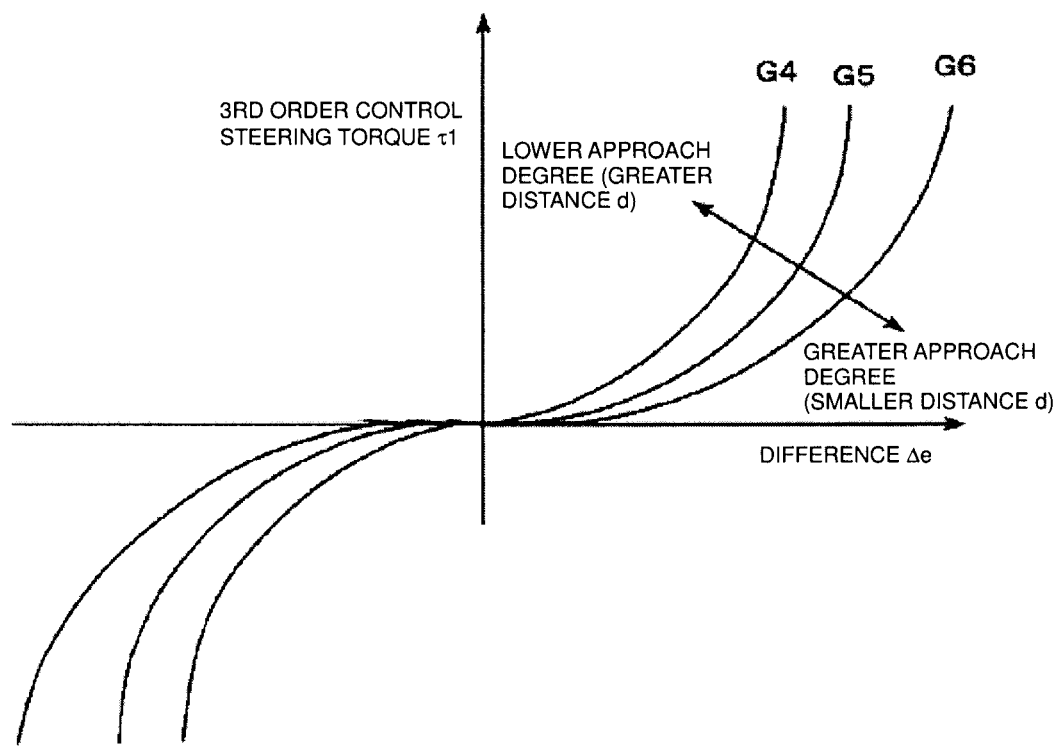
FIG. 9 is a graph showing a correlation between the deviation and a third order control target steering torque when a third order control steering torque computation gain is changed according to the approach degree in the steering assist apparatus of the embodiment.

FIG. 9 is a graph showing a correlation between the difference Δe and the third order control target steering torque τ3 when the third order control steering torque computation gain GX3 is changed according to the approach degree.

The steering control unit 150 sequentially changes the first order control steering torque computation gain Gx1 from G1 to G2 and G3 according to the increase of the approach degree (that is, the reduction of the distance d). Further, the steering control unit 150 sequentially changes the third order control steering torque computation gain Gx3 from G4 to G5 and G6 according to the increase of the approach degree (that is, the reduction of the distance d). Here, such changes of gain are not limited to changes made in stages and may be made in a continuous manner.

When the gain is reduced according to the increase of the approach degree in this manner, the target steering torque τ reduces as shown in FIGS. 8 and 9 if the difference Δe does not change.

Further, when a condition where the lateral distance d between the neighboring vehicle NV and the white line WL is kept lower than a predetermined threshold value d2 (d2<d1) continues a predetermined determination period, the steering control unit 150 fixes the first order control steering torque computation gain GX1 and the third order control steering torque computation gain GX3 to minimum values which are smaller than G3 and G6 respectively, in order to reduce variation of control outputs.

After that, the process proceeds to step S66.

<Step S66: Braking Correction>

When the braking detection unit 210 detects a braking operation by the driver, the steering control unit 150 executes a braking correction to further reduce the first order control target steering torque τ1 and the third order control target steering torque τ3 which are reduced in step S65.

After that, a series of processes ends and the process returns to the main routine shown in FIG. 6 and proceeds to step S70.

<Step S67: Determination of Deviation Tendency Toward Lane of Neighboring Vehicle>

The deviation determination unit 140 determines whether the vehicle OV has a lane deviation tendency toward the lane in which the neighboring vehicle NV is traveling. When it is determined that the vehicle OV has a deviation tendency, the process proceeds to step S68. In other cases, the process proceeds to step S62.

<Step S68: Gain Increase>

The steering control unit 150 executes a steering force increase control to increase the first order control steering torque computation gain GX1 and the third order control steering torque computation gain GX3 according to the increase of the approach degree (that is, the reduction of the distance d).

After that, a series of processes ends and the process returns to the main routine shown in FIG. 6 and proceeds to step S70.

<Step S70: Steering Torque Setting>

The steering control unit 150 sets the target steering torque τ based on the difference Δe obtained in step S50, the first order control steering torque computation gain GX1 and third order control steering torque computation gain GX3 set in step S60.

After that, the process proceeds to step S80.

<Step S80: Steering Force Generation>

The steering control unit 150 instructs the EPS control unit 20 so that the electric actuator 21 applies steering torque to the steering mechanism 10 based on the target steering torque τ set in step S70. After that, a series of process ends (returns).

According to the above described embodiment, the following effect can be obtained. (1) When it is determined that the vehicle OV has a deviation tendency in a direction away from the traveling lane of the neighboring vehicle NV, the target steering torque τ in the deviation avoiding direction is reduced according to the reduction of the lateral distance d between the neighboring vehicle NV and the white line WL. This reduces an interference with the driver's steering operations to intentionally deviate from the lane and accordingly prevents the driver from experiencing discomfort. Further, since the target steering torque τ is reduced according the lateral distance d, a lane deviation can be prevented by controlling the reduction of the target steering torque τ when the approach degree is low and the driver is less likely to operate to avoid the neighboring vehicle NV. On the other hand, when the approach degree is high and the driver is likely to operate to avoid the neighboring vehicle NV, the target steering torque τ is considerably reduced to improve the interference prevention effect. (2) Since a parallel traveling end time is estimated based on the inter-vehicle distance Zff and relative velocity Vzf between the vehicle OV and the neighboring vehicle NV and steering force reduction control ends at the timing corresponding to the estimation, when the condition of parallel traveling with the neighboring vehicle NV is finished, the steering assist control unit 100 can return to a normal control to assist driver's driving operations. (3) Since the inter-vehicle distance Zff and relative velocity Vzf between the vehicle OV and the neighboring vehicle NV are detected by using, as the reference, the vehicle front end point Pf, which is a front end of the side surface S in the neighboring vehicle NV detected by the side surface recognition unit 161, the above described parallel traveling end time can be properly estimated. (4) The target steering torque τ is more reduced when the decelerating operation is detected than the case where the decelerating operation is not detected. This can prevent an interference with an emergency avoiding operation by the driver. (5) When it is determined that the vehicle OV has a deviation tendency toward the traveling lane of the neighboring vehicle NV, the target steering torque τ in a deviation avoiding direction is increased according to the increase of the approach degree. This can prevent that the vehicle OV deviates from the traveling lane toward the neighboring vehicle NV and contacts with the neighboring vehicle NV. (6) When the approach degree is kept equal to or greater than a predetermine threshold value for longer than a predetermined period of time, the gains Gx1 and Gx3 used in the steering force calculations are switched to constant values which are smaller than the normal gains. This allows to reduce variation of the target steering torque τ.

(Modification Examples)

The present invention is not limited to the above described embodiment, various modifications and changes can be applied and those modifications and changes are included within the technical scope of the present invention. (1) The above embodiment has a configuration in which the environment recognition is performed using the stereo camera; however, the above embodiment is not limited to this configuration and may have a configuration in which the distance from the preceding vehicle is detected using a millimeter wave radar, a laser radar, ultrasonic waves and the like. Further, the information related to the traveling lane of the vehicle can be obtained by map data installed in a navigation device, for example. (2) The configuration of the actuator for applying steering torque to the steering mechanism is not limited to the column assist type as described in the embodiment. The configuration of the actuator may be a pinion assist type for driving a pinion shaft connected to the steering shaft, a double pinion type for driving a pinion connected to the steering shaft and an independent pinion, a rack drive type for driving the steering rack itself in a linear direction, and the like. (3) The method for calculating the approach degree of the neighboring vehicle toward the vehicle is not limited to what is described in the above embodiment and may be changed according to need. For example, the method is not limited to detecting the end point of the neighboring vehicle, which is in the side closer to the vehicle, and the approach degree may be calculated based on the center of gravity of the neighboring vehicle and the like. Further, the reference position in the side of the traveling lane of the vehicle is not limited to the white line. Further, the method for detecting the end point of the neighboring vehicle, which is in the side closer to the vehicle, is not limited either. (4) The method for detecting the decelerating operation in the vehicle is not limited to what is described in the above embodiment. For example, the decelerating operation can be detected based on ON/OFF of the brake lamp switch as a substitute for the brake fluid hydraulic pressure. Further, the decelerating operation can be detected based on an acceleration applied to the vehicle body, changes in vehicle wheel speed, and the like. In addition to the decelerating using the brake, the decelerating operation can be detected based on a fully-closing operation of an accelerator pedal or a downshift operation using the transmission. (5) According to the above embodiment, the control output is obtained by combining the target steering torques calculated in the first order control and third order control; however, the above embodiment is not limited to this configuration and may use torque elements based on other controls. For example, in case where it is determined that there is a lane divergence tendency, pulsed steering torque may be output in order to alert the driver. (6) According to the above embodiment, the approach degree of the neighboring vehicle NV toward the vehicle OV is detected based on the distance between the neighboring vehicle NV and the vehicle OV; however, the present invention is not limited to this configuration. For example, the approach degree may be detected based on the deviation between the lateral position of the vehicle and the lateral position of the neighboring vehicle. (7) The method for reducing the steering force is not limited to changing the gains used to calculate target steering torque as described in the embodiment and the steering force may be changed according to need.

What is claimed is:

1. A steering assist apparatus of a vehicle, for applying steering force to a steering mechanism of the vehicle so that the vehicle travels on a target traveling position in a traveling lane; comprising:

a lane set unit configured to recognize an environment ahead the vehicle and set the traveling lane;

a deviation determination unit configured to determine whether the vehicle has a deviation tendency from the traveling lane;

a steering control unit configured to apply steering force in a deviation avoiding direction to the steering mechanism when it is determined that the vehicle has a deviation tendency;

a neighboring vehicle detection unit configured to detect a neighboring vehicle, which travels ahead of the vehicle and in a lane next to the traveling lane of the vehicle, based on the recognized environment; and an approach degree calculation unit configured to calculate an approach degree of the neighboring vehicle toward the vehicle based on the neighboring vehicle detection, wherein the steering control unit performs a steering force reduction control for reducing the steering force in the deviation avoiding direction according to an increase of the approach degree when the deviation determination unit determines that the vehicle has a deviation tendency in a direction away from the traveling lane of the neighboring vehicle.

2. The steering assist apparatus according to claim 1, further comprising:
   a distance detection unit configured to detect a distance between the vehicle and the neighboring vehicle in a traffic direction of the vehicle;
   a relative velocity detection unit configured to detect a relative velocity of the neighboring vehicle with respect to the vehicle; and
   an end time estimation unit configured to estimate an end time of a parallel travel of the vehicle and the neighboring vehicle based on the distance and the relative velocity,
   wherein the steering control unit ends the steering force reduction control based on the end time estimated by the end time estimation unit.

3. The steering assist apparatus according to claim 2, further comprising:
   a side surface recognition unit configured to recognize a front end of a side surface in the neighboring vehicle based on a group of images of the neighboring vehicle captured by a plurality of imaging units,
   wherein the distance detection unit and the relative velocity detection unit detect the distance and the relative velocity respectively by referring to the recognized front end.

4. The steering assist apparatus according to claim 1, further comprising:
   a decelerating operation detection unit configured to detect a decelerating operation by a driver,
   wherein the steering control unit reduces the steering force at a greater degree when the decelerating operation is detected than the case where the decelerating operation is not detected.

5. The steering assist apparatus according to claim 1, wherein
   the steering control unit performs a steering force increase control for increasing the steering force in the deviation avoiding direction according to an increase of the approach degree when the deviation determination unit determines that the vehicle has a deviation tendency toward the traveling lane of the neighboring vehicle.

6. The steering assist apparatus according to claim 1, wherein
   the steering control unit applies steering force, in which a predetermined gain is multiplied to a lateral displacement of the vehicle from the traveling lane, to the steering mechanism, and switches the gain to a predetermined value smaller than the normal gain when the approach degree of the neighboring vehicle is kept greater than a predetermined threshold value for longer than a predetermined period of time.

* * * * *